(12) United States Patent
Tsukada et al.

(10) Patent No.: US 10,960,896 B2
(45) Date of Patent: Mar. 30, 2021

(54) CONTROL APPARATUS

(71) Applicant: HONDA MOTOR CO., LTD., Tokyo (JP)

(72) Inventors: Yoshiaki Tsukada, Saitama (JP); Takashi Ozeki, Saitama (JP); Kenichi Nakano, Saitama (JP); Sumitaka Ogawa, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 96 days.

(21) Appl. No.: 16/368,902

(22) Filed: Mar. 29, 2019

(65) Prior Publication Data

US 2019/0300012 A1 Oct. 3, 2019

(30) Foreign Application Priority Data

Mar. 29, 2018 (JP) .............................. JP2018-064533

(51) Int. Cl.
| | |
|---|---|
| *G06F 7/00* | (2006.01) |
| *B60W 50/08* | (2020.01) |
| *B60W 40/08* | (2012.01) |
| *B60T 8/17* | (2006.01) |
| *B60T 7/12* | (2006.01) |

(52) U.S. Cl.
CPC .............. *B60W 50/08* (2013.01); *B60T 7/12* (2013.01); *B60T 8/1706* (2013.01); *B60W 40/08* (2013.01); *B60T 2220/02* (2013.01); *B60W 2040/0818* (2013.01); *B60W 2300/36* (2013.01); *B60W 2510/18* (2013.01)

(58) Field of Classification Search
CPC ................. B60W 50/08; B60W 40/08; B60W 2040/0818; B60W 2300/36; B60W 2510/18; B60T 7/12; B60T 8/1706; B60T 2220/02
USPC .......................................................... 701/36
See application file for complete search history.

(56) References Cited

U.S. PATENT DOCUMENTS

| 10,086,808 B2 | 10/2018 | Kajiyama |
| 2012/0303234 A1 | 11/2012 | Matsuda |
| 2014/0015662 A1 | 1/2014 | Oettgen |

(Continued)

FOREIGN PATENT DOCUMENTS

| JP | 2006182283 A | 7/2006 |
| JP | 2009166616 A | 7/2009 |

(Continued)

OTHER PUBLICATIONS

Office Action issued for counterpart Japanese Application No. 2018-064533, drafted by the Japan Patent Office dated Sep. 12, 2019.

(Continued)

*Primary Examiner* — Mahmoud S Ismail

(57) ABSTRACT

A saddle-ride type vehicle control apparatus includes: an acquiring unit that acquires information indicating a posture of an occupant of a saddle-ride type vehicle; a determining unit that determines a level of intervention in driving of the saddle-ride type vehicle based on the posture of the occupant indicated by the information acquired by the acquiring unit; and an intervening unit that intervenes in the driving of the saddle-ride type vehicle based on a condition of the saddle-ride type vehicle and the level of intervention determined by the determining unit.

14 Claims, 6 Drawing Sheets

(56) References Cited

U.S. PATENT DOCUMENTS

2017/0008591 A1* 1/2017 Abbott .................... B62K 5/05
2017/0028971 A1* 2/2017 Kajiyama ............. B60W 30/08
2020/0156605 A1* 5/2020 Hamm .................. B60T 8/1706

FOREIGN PATENT DOCUMENTS

| JP | 4434940 B2 | 3/2010 |
| JP | 6214601 B2 | 10/2017 |
| JP | 2017178284 A | 10/2017 |

OTHER PUBLICATIONS

Office Action issued for counterpart Indian Application No. 201914012072, drafted by the India Intellectual Property Office dated Jun. 26, 2020.

* cited by examiner

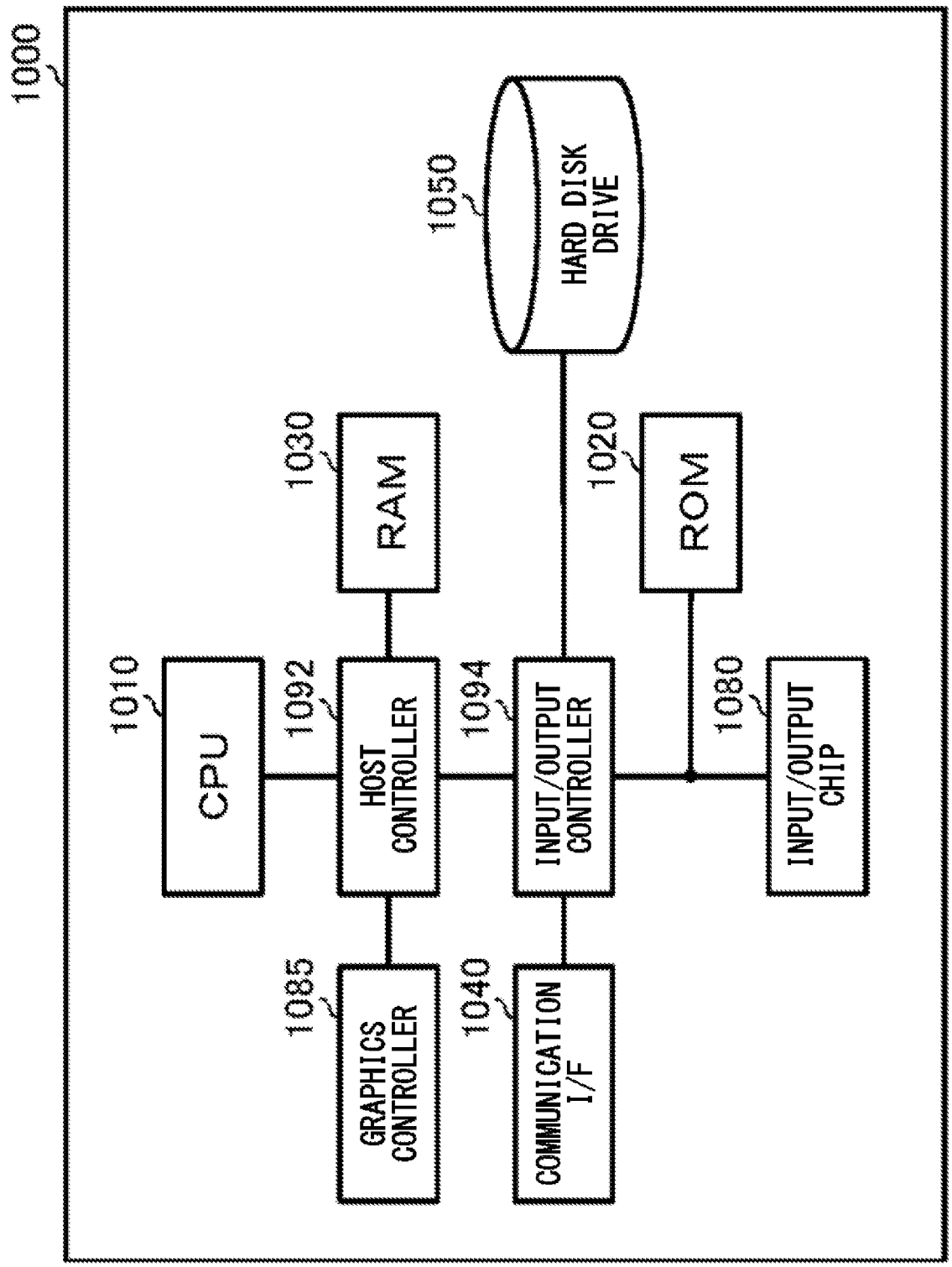

CONTROL APPARATUS

The contents of the following patent application are incorporated herein by reference:
Japanese Patent Application NO. 2018-064533 filed on Mar. 29, 2018.

BACKGROUND

1. Technical Field

The present invention relates to a control apparatus.

2. Related Art

Brake control technologies such as anti-lock braking systems (ABS) for two wheel vehicles are known (see the following Patent Literatures, for example).

PRIOR ART LITERATURES

Patent Literatures

[Patent Literature 1] Japanese Patent Application Publication No. 2017-24644
[Patent Literature 2] Japanese Patent Application Publication No. 2009-166616
[Patent Literature 3] Japanese Patent Application Publication No. 2006-182283

SUMMARY

When driving of a saddle-ride type vehicle is intervened, there are amounts of such intervention that are permissible depending on driving postures, and it is desired in some cases to intervene in the driving after inducing adjustment of the level of intervention and the driving posture depending on the posture of an occupant.

BRIEF DESCRIPTION OF THE DRAWINGS

FIG. 6 schematically illustrates an exemplary computer 1000 to function as the control apparatus 100.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
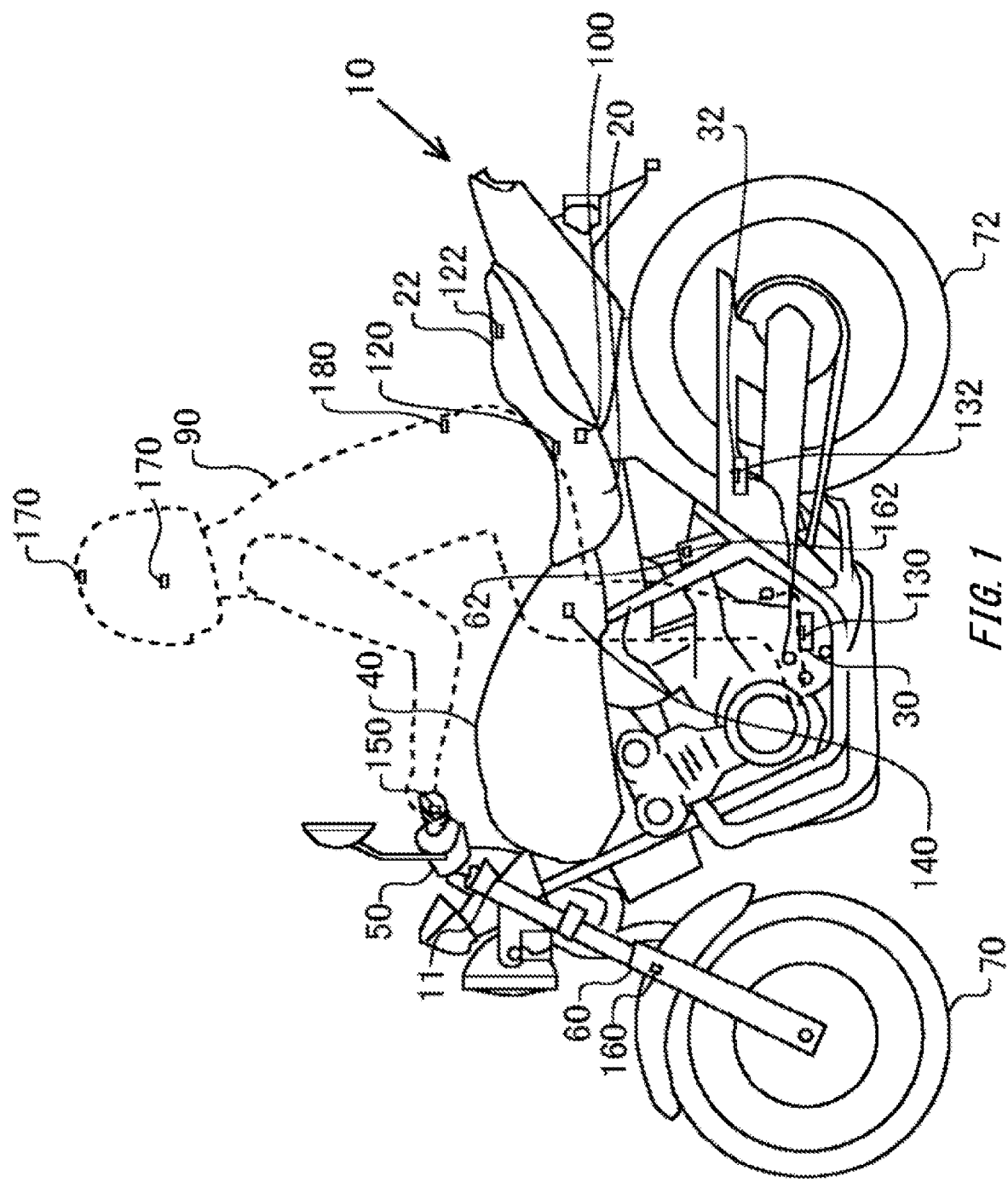
FIG. 1 schematically illustrates the configuration of a saddle-ride type vehicle 10.

FIG. 1 schematically illustrates the configuration of a saddle-ride type vehicle 10. FIG. 1 is a left-side view of the saddle-ride type vehicle 10. The saddle-ride type vehicle 10 is a motorcycle. The saddle-ride type vehicle 10 travels by power from a power source such as an engine or motor being transmitted to a rear wheel 72.

The saddle-ride type vehicle 10 includes: a seat 20 on which a driver 90 is seated; a seat 22 on which a passenger is seated; steps 30 on which the feet of the driver 90 are placed; steps 32 on which the feet of the passenger are placed; a structure 40; a steering handle 50 gripped by the driver 90; a front wheel suspension device 60; a rear wheel suspension device 62; and a control apparatus 100. The structure 40 is arranged between a head pipe 11 of the saddle-ride type vehicle 10 and the seat 20.

The seat 20 is provided with a sensor 120 that senses force applied to the seat 20 when the driver 90 is seated on the seat 20. The sensor 120 is provided to be able to sense force at each of a plurality of points within a seat surface of the seat 20. The seat 22 is provided with a sensor 122 to sense force applied to the seat 22 when the passenger is seated on the seat 22.

The steps 30 are provided with sensors 130 to sense force applied to the steps 30 when the feet of the driver 90 are placed on the steps 30. The sensors 130 are each provided at one of the right-side step and left-side step for the driver 90. The steps 32 are provided with sensors 132 to sense force applied to the steps 32 when the feet of a passenger are placed on the steps 32. The sensors 132 are each provided at one of the right-side step and left-side step for the passenger.

The structure 40 is provided with sensors 140 to sense knee grip force of the driver 90. The sensors 140 are each provided at one of the right-side and left-side of the structure 40. What is arranged at the structure 40 portion is not limited to a fuel tank, but may be a fuel tank cover or a luggage space.

Grip portions of the steering handle 50 are provided with sensors 150 to sense force that is applied when the driver 90 grips the grip portions. The sensors 150 are each provided at one of the left and right grip portions of the steering handle 50.

The front wheel suspension device 60 is provided with a sensor 160 to sense vertical force at a front wheel 70. The rear wheel suspension device 62 is provided with a sensor 162 to sense vertical force at a rear wheel 72.

A helmet worn by the driver 90 is provided with sensors 170 to sense the position of the helmet. The sensors 170 are provided at a top portion of the helmet, and both sides which are located to the left and right of the driver 90 when the helmet is worn by the driver 90. The sensors 170 are used as sensors to sense the position and direction of a head portion of the driver 90. The direction of the head portion of the driver 90 can be considered as indicative of the line-of-sight direction of the driver 90. The sensors 170 are exemplary sensors to sense the line-of-sight direction of the driver 90. Instead of the sensors 170, or in addition to the sensors 170, a camera that is provided inside the helmet and captures images of the face or eyes of the driver 90 may sense the line-of-sight direction of the driver 90.

Clothing worn by the driver 90 is provided with a sensor 180 to sense the position around the middle of the waist of the driver 90. The control apparatus 100 senses the tilting angle of an upper body portion of the driver 90 to the vertical direction, based on results of sensing by the sensors 170 and sensor 180. The control apparatus 100 senses the lean angle of the driver 90 from the difference between the tilting angle of the saddle-ride type vehicle 10 and the tilting angle of the upper body portion to the vertical direction.

The control apparatus 100 determines the level of intervention in driving of the saddle-ride type vehicle 10 based on outputs from the sensor 120, sensor 122, sensors 130, sensors 132, sensor 160, and sensor 162 that are provided as saddle-ride type vehicle 10-side sensors, and the sensors 170, and sensor 180 that are provided as driver 90-side sensors.

For example, the control apparatus 100 senses the posture of the driver 90 based on: the lean angle of the saddle-ride type vehicle 10; the degree of non-uniformity of force within the seat surface sensed by the sensor 120; the difference in applied force between the left and right steps sensed by the sensors 130; the magnitude of the knee grip force applied by the driver 90 and sensed by the sensors 140; the grip force at the grip portions applied by the driver 90 and sensed by the sensors 150; and the difference in the vertical force between the front wheel 70 and rear wheel 72 sensed by the sensor 160 and the sensor 162, respectively. For example, the control apparatus 100 decides that the driver 90 is assuming a posture dictating a small permissible intervention amount if the lean angle is larger than a reference value, if the degree of non-uniformity of force sensed by the sensor 120 is larger than a reference value, if the difference in applied force between the left and right steps is larger than a reference value, or in other cases.

As the permissible intervention amount decreases, the level of intervention by the control apparatus 100 in driving of the saddle-ride type vehicle 10 determined by the control apparatus 100 lowers. The control apparatus 100 intervenes in driving of the saddle-ride type vehicle 10 at the determined level of intervention. For example, if the saddle-ride type vehicle 10 is in an emergency, the control apparatus 100 brakes the saddle-ride type vehicle 10 by operating a braking device, even when the driver 90 is not manipulating a brake manipulating element.

In this manner, the control apparatus 100 intervenes in driving of the saddle-ride type vehicle 10 at the level of intervention determined based on the posture of the driver 90. Thereby, if it is decided that the driver 90 is not assuming a stand-ready posture, the level of intervention in driving of the saddle-ride type vehicle 10 can be lowered. Because of this, it is possible to suppress a significant loss of balance of the driver 90 when the control apparatus 100 intervenes in driving of the saddle-ride type vehicle 10. On the other hand, if the driver 90 is assuming a stand-ready posture, it is easy for the driver 90 to adjust the posture responding to the intervention, and so it is less likely that even an increased level of intervention in driving of the saddle-ride type vehicle 10 leads to a loss of balance of the driver 90.

Figure 2:
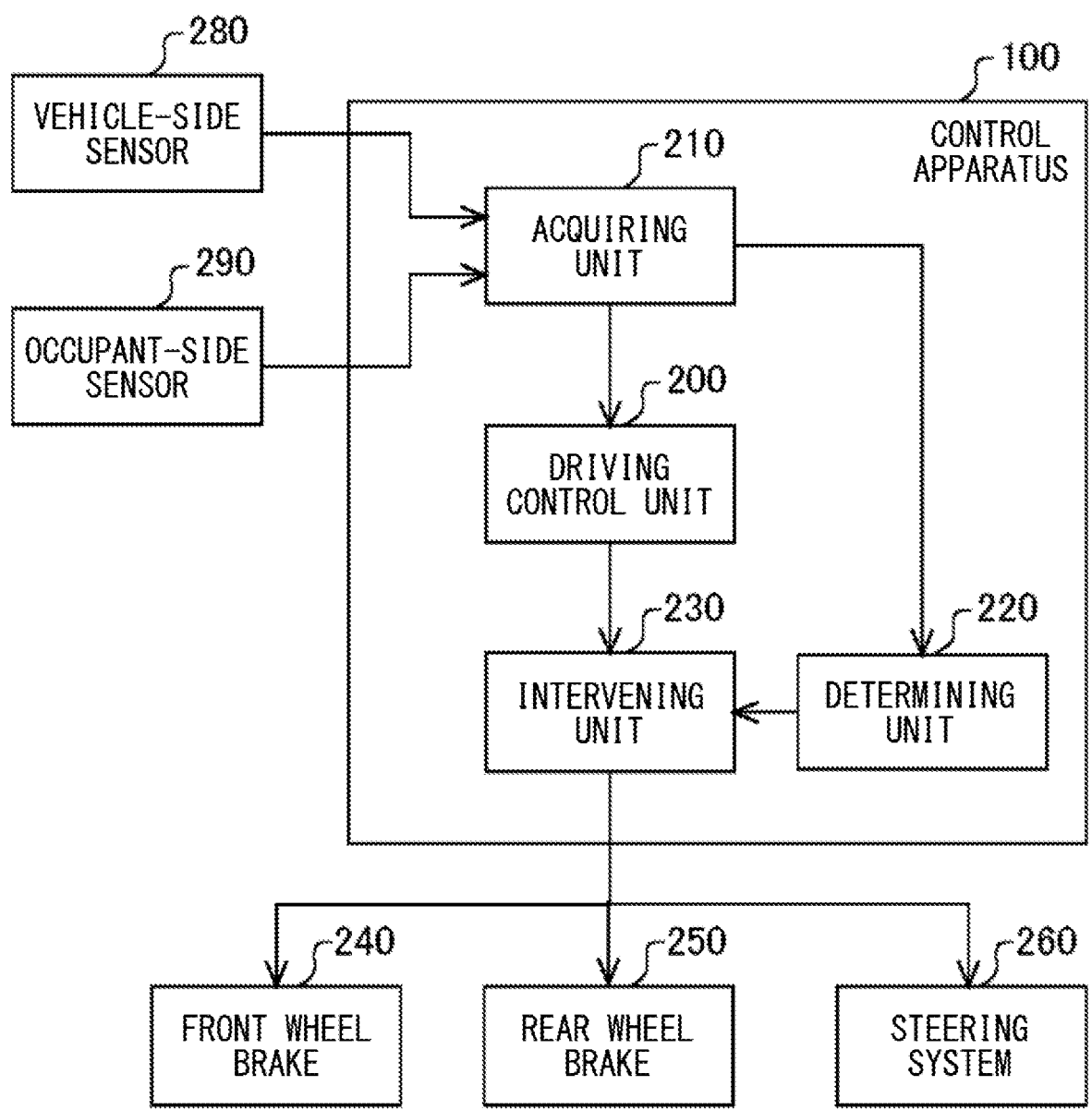
FIG. 2 is a block diagram schematically illustrating a control apparatus 100, a vehicle-side sensor 280, an occupant-side sensor 290, a front wheel brake 240, a rear wheel brake 250, and a steering system 260.

FIG. 2 schematically illustrates the block configuration of a system including the control apparatus 100, a vehicle-side sensor 280, an occupant-side sensor 290, a front wheel brake 240, a rear wheel brake 250, and a steering system 260. The control apparatus 100 has an acquiring unit 210, a driving control unit 200, an intervening unit 230, and a determining unit 220. Functions of the control apparatus 100 may be realized by an ECU of the saddle-ride type vehicle 10.

The vehicle-side sensor 280 includes the above-mentioned sensor 120, sensor 122, sensors 130, sensors 132, sensors 140, sensors 150, sensor 160, and sensor 162. The vehicle-side sensor 280 also includes a vehicle speed sensor, and an ambient sensor for senses information about a surrounding environment of the saddle-ride type vehicle 10. Examples of the ambient sensor include a distance-measurement sensor, a radar, a camera, and the like. The vehicle speed sensor senses the vehicle speed of the saddle-ride type vehicle 10. The vehicle speed sensor may sense the respective rotational speeds of the front wheel 70, and rear wheel 72. The vehicle-side sensor 280 may include sensors to sense: an amount of manipulation of each of a front wheel brake manipulating element and a rear wheel brake manipulating element by the driver 90; an amount of manipulation of the steering handle 50 by the driver 90; an amount of manipulation of an accelerator manipulating element by the driver 90; an amount of manipulation of a clutch manipulating element by the driver 90; or the like. The occupant-side sensor 290 includes the sensor 180, and sensors 170.

The acquiring unit 210 acquires results of sensing by the vehicle-side sensor 280, and occupant-side sensor 290. The driving control unit 200 generates control information about the saddle-ride type vehicle 10 based on the results of sensing acquired by the acquiring unit 210. For example, the driving control unit 200 generates control information based on information sensed by the vehicle-side sensor 280. Specifically, the driving control unit 200 generates control information such as braking force generated by each of the front wheel brake 240, and rear wheel brake 250, or driving force generated by a power source.

The information acquired by the acquiring unit 210 includes information indicating the posture of an occupant. For example, the sensor 120, sensor 122, sensors 130, sensors 132, sensor 160, and sensor 162, and the sensor 170, and sensor 180 may provide information indicating the posture of the driver 90 or the passenger. The information indicating the posture of an occupant may include information indicating at least one of: force applied to a seat on which the occupant is seated; force applied to the steps 30 on which the feet of the occupant are placed; knee grip force of the occupant; force applied to grip portions gripped by the occupant; a lean angle; and force applied to a front wheel and a rear wheel of the saddle-ride type vehicle 10, or the like. Note that an occupant includes at least one of the driver 90, and the passenger.

The determining unit 220 determines the level of intervention in driving of the saddle-ride type vehicle 10 based on the posture of an occupant indicated by the information acquired by the acquiring unit 210. The intervening unit 230 intervenes in driving of the saddle-ride type vehicle 10 based on the condition of the saddle-ride type vehicle 10, and the level of intervention determined by the determining unit 220.

The intervention includes main intervention, and preliminary intervention which is executed in advance prior to the main intervention at a lower level of intervention than the main intervention. For example, the main intervention really controls the vehicle. The preliminary intervention notifies an occupant of the start of control in advance prior to the main intervention. The preliminary intervention allows the occupant to recognize the intervention beforehand, and provides an effect of prompting the occupant to adjust the driving posture back to an appropriate posture.

As a permissible intervention amount for the occupant set based on the posture of the occupant decreases, the level of intervention in the driving of the saddle-ride type vehicle 10 determined by the determining unit 220 lowers. Thereby, it is possible to lower the possibility of a significant loss of balance of the occupant due to significant intervention in driving when the permissible intervention amount for the occupant is low.

The intervening unit 230 intervenes in the operation of a braking device of the saddle-ride type vehicle 10 based on braking force set based on the condition of the saddle-ride type vehicle 10, and the level of intervention determined by the determining unit 220. Examples of the condition of the saddle-ride type vehicle 10 include the distance to an obstacle around the saddle-ride type vehicle 10 which is present in the advancing direction of the saddle-ride type vehicle 10, the speed of the saddle-ride type vehicle 10, and the like.

The determining unit 220 compares postures of an occupant before and after the intervening unit 230 operates the front wheel brake 240 or rear wheel brake 250. As the postural change of the occupant before and after the operation increases, the level of intervention in driving of the saddle-ride type vehicle 10 determined by the determining unit 220 lowers. If the postural change of the occupant when the brake is applied is large, the stand-ready posture of the occupant might be insufficient. Since as the postural change of the occupant when the brake is operated increases, the level of intervention determined by the determining unit 220 lowers, it is possible to lower the possibility of a significant loss of balance of the occupant.

The intervening unit 230 operates at least one of the front wheel brake 240 and the rear wheel brake 250 based on braking force set based on a positional relationship between an object around the saddle-ride type vehicle 10 and the saddle-ride type vehicle 10, and the level of intervention determined by the determining unit 220. Thereby, it is possible to determine, according to the level of intervention, braking force appropriate for mitigating emergencies.

The intervening unit 230 may intervene in the operation of the steering system 260 of the saddle-ride type vehicle 10 based on braking force set based on the condition of the saddle-ride type vehicle 10, and the level of intervention determined by the determining unit 220. The intervening unit 230 may intervene in a steering amount of the steering system 260. In addition, the intervening unit 230 may change a caster angle of the steering system 260.

The posture of the occupant may be judged based on force applied to the seat 20 or force applied to the steps 30 on which the feet of the occupant are placed. As the difference in applied force between the left-side step and right-side step increases, or the degree of non-uniformity within the seat surface of the seat 20 of force applied to the seat surface increases, the level of intervention in driving of the saddle-ride type vehicle 10 determined by the determining unit 220 may lower. In addition, a plurality of seat sensors may be provided, and if so, it is possible to more appropriately acquire the current posture of the occupant based on at which portion of the seat the weight of the occupant is applied. As the force applied to the seat 20 decreases, the level of intervention in driving of the saddle-ride type vehicle 10 determined by the determining unit 220 may lower. As the weighted total value of force applied to the seat 20 and knee grip force decreases, the level of intervention in driving of the saddle-ride type vehicle 10 determined by the determining unit 220 may lower. The determining unit 220 may determine the level of intervention in driving of the saddle-ride type vehicle 10 based on the magnitude relationship between force applied to the front wheel 70 and rear wheel 72 of the saddle-ride type vehicle 10. Examples of measures of the magnitude relationship between force applied to the front wheel 70 and rear wheel 72 include the difference between vertical force at wheel sensed by the sensor 160 and vertical force at wheel sensed by the sensor 162.

The acquiring unit 210 further acquires information indicating whether or not a passenger is present. Examples of the information indicating whether or not a passenger is present include results of sensing by the sensors 132, and sensor 122. the level of intervention in driving of the saddle-ride type vehicle 10 determined by the determining unit 220 may lower if the information acquired by the acquiring unit 210 indicates that a passenger is present.

The acquiring unit 210 further acquires information indicating a line of sight of the occupant. Examples of the information indicating a line of sight include information indicating the direction of a head portion of the driver 90 sensed by the sensors 170. The determining unit 220 changes the level of intervention based on the line of sight of the occupant indicated by the information acquired by the acquiring unit 210. For example, the determining unit 220 may calculate a permissible intervention amount based on the line of sight of the occupant indicated by the information acquired by the acquiring unit 210, and as the calculated permissible intervention amount decreases, the level of intervention in driving of the saddle-ride type vehicle 10 determined by the determining unit 220 may lower. Generally, it is possible to assume a stable posture by directing the line of sight toward a forward direction, and so it becomes possible to increase the permissible intervention amount.

Based on information sensed by the sensor 120, sensors 130, sensors 140, sensors 150, sensor 160, and sensor 162, the determining unit 220 calculates a permissible intervention amount based on the posture of the driver 90. In addition, based on the line-of-sight direction of the driver 90, the determining unit 220 calculates a permissible intervention amount based on the line of sight of the driver 90. Based on the permissible intervention amount based on the posture, the permissible intervention amount based on the line of sight, and the presence or absence of a passenger, the determining unit 220 determines a level of intervention in driving.

For example, as the degree of non-uniformity of force applied to the seat surface of the seat 20 sensed by the sensors 120 increases, the permissible intervention amount calculated by the determining unit 220 based on the posture decreases. As the difference in force applied to the left and right steps 30 sensed by the sensors 130 increases, the permissible intervention amount calculated by the determining unit 220 based on the posture decreases. As the knee grip force sensed by the sensors 140 decreases, the permissible intervention amount calculated by the determining unit 220 based on the posture decreases. As the grip force at the grip portions applied by the driver 90 sensed by the sensors 150 decreases, the permissible intervention amount calculated by the determining unit 220 based on the posture decreases. As the difference between vertical force at the front wheel 70 and the rear wheel 72 sensed by the sensor 160 and the sensor 162, respectively, increases, the permissible intervention amount calculated by the determining unit 220 based on the posture decreases. The determining unit 220 may calculate the permissible intervention amount based on the posture by referring to a map in which: the degree of non-uniformity of force applied to the seat surface of the seat 20; differences between force applied to the left and right steps 30; knee grip force; grip force at the grip portions; and differences between vertical force at the front wheel 70 and the rear wheel 72 are associated with permissible intervention amounts based on the posture.

As the difference between the line-of-sight direction of the driver 90 and the advancing direction of the saddle-ride type vehicle 10 increases, the permissible intervention amount calculated by the determining unit 220 based on the line of sight decreases. As the temporal change amount of the line-of-sight direction of the driver 90 increases, the permissible intervention amount calculated by the determining unit 220 based on the line of sight decreases. The determining unit 220 may calculate the permissible intervention amount based on the line of sight by referring to a map in which differences between the line-of-sight direction of the driver 90, and the advancing direction of the saddle-ride type vehicle 10; and temporal change amounts of the line-of-sight direction of the driver 90 are associated with permissible intervention amounts based on the line of sight.

The determining unit 220 decides the presence or absence of a passenger based on force sensed by the sensor 122 and force sensed by the sensors 132.

As the permissible intervention amount based on the posture decreases, the level of intervention determined by the determining unit 220 lowers. As the permissible intervention amount based on the line of sight decreases, the level of intervention determined by the determining unit 220 lowers. If a passenger is present, the level of intervention determined by the determining unit 220 lowers as compared to the case where a passenger is not present.

Figure 3:
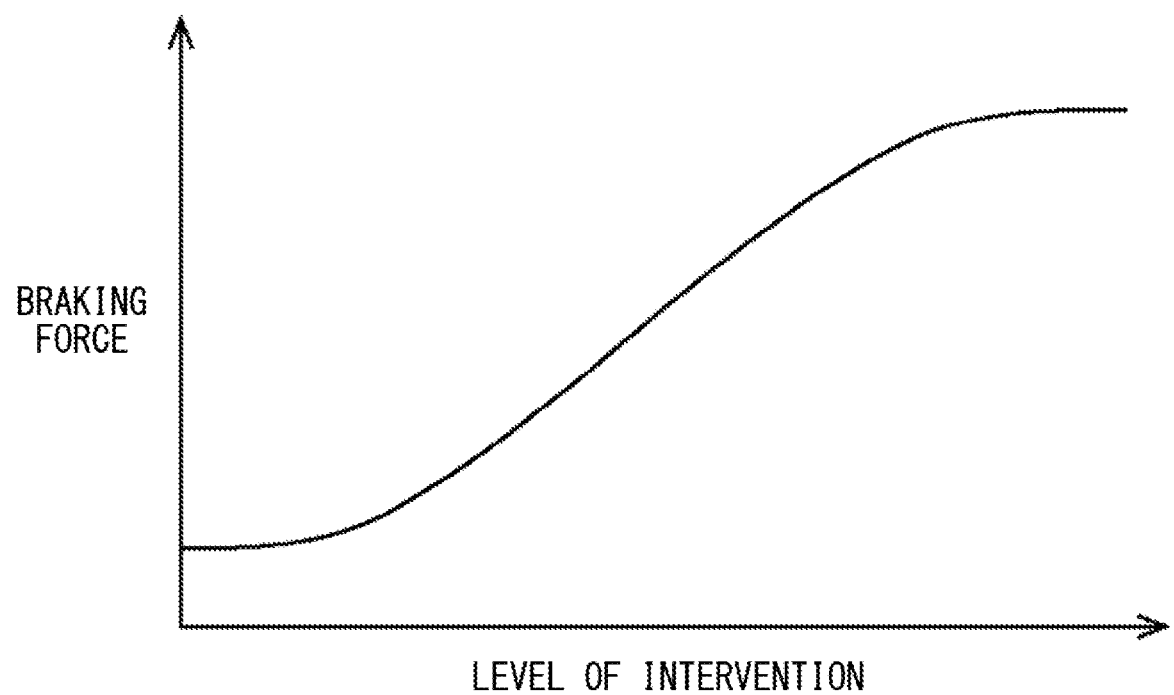
FIG. 3 schematically illustrates a braking force map in which levels of intervention and braking force generated by emergency braking are associated with each other.

FIG. 3 schematically illustrates a braking force map in which levels of intervention and braking force generated by emergency braking are associated with each other. In FIG. 3, the rightward direction along the horizon axis corresponds to higher levels of intervention. The upward direction along the vertical axis corresponds to greater braking force. As illustrated in FIG. 3, as the level of intervention decreases, the intervening unit 230 reduces the braking force at the front wheel brake 240 and rear wheel brake 250 generated in emergency braking control.

The braking force in FIG. 3 may be maximum braking force that is permissible when the intervening unit 230 performs emergency braking. The intervening unit 230 may control the braking force generated at the front wheel brake 240 and rear wheel brake 250 such that the braking force generated by the front wheel brake 240 and rear wheel brake 250 becomes equal to or lower than braking force that is set based on the level of intervention determined by the determining unit 220 and the braking force map illustrated in FIG. 3.

Note that the intervening unit 230 may control the braking force generated by the front wheel brake 240 and the braking force generated by the rear wheel brake 250 such that as the level of intervention decreases, the ratio of the braking force of the front wheel 70 to the braking force of the rear wheel 72 decreases. Since, thereby, when the permissible intervention amount is small, the braking force of the front wheel 70 can be made smaller as compared with the braking force of the rear wheel 72, it becomes possible to suppress a significant loss of balance of the driver 90.

Figure 4:
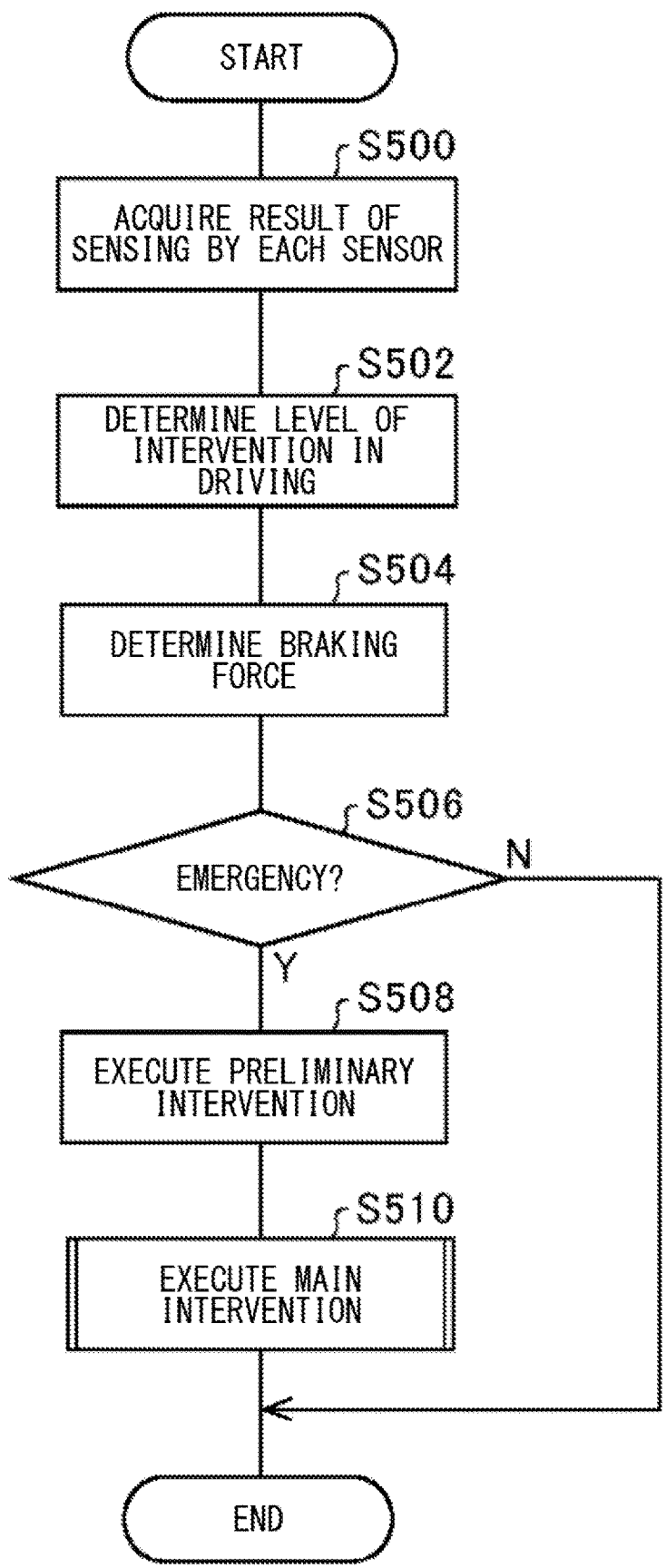
FIG. 4 illustrates an exemplary flowchart illustrating processes performed at the control apparatus 100.

FIG. 4 illustrates an exemplary flowchart illustrating processes performed at the control apparatus 100. The processes of the flowchart illustrated in FIG. 4 are executed repeatedly to decide whether or not to perform emergency braking.

At S500, the acquiring unit 210 acquires results of sensing by individual sensors included in the vehicle-side sensor 280, and occupant-side sensor 290.

At S502, the determining unit 220 determines the level of intervention in driving of the saddle-ride type vehicle 10 based on results of sensing by the individual sensors acquired at S500.

At S504, based on the level of intervention determined at S502, the intervening unit 230 determines the braking force to be applied at the time of emergency braking. For example, the intervening unit 230 may determine the braking force following the braking force map illustrated in FIG. 3.

At S506, the intervening unit 230 decides whether or not it is in an emergency. For example, based on the condition of the saddle-ride type vehicle 10 or the like, the intervening unit 230 may decide whether or not it is necessary to decelerate the saddle-ride type vehicle 10 urgently. If it is decided at S506 that it is in an emergency, the intervening unit 230 executes preliminary intervention at S508. For example, the intervening unit 230 actuates at least one of the front wheel brake 240 and rear wheel brake 250 at a predetermined strength weaker than main intervention mentioned below.

After a lapse of predetermined time t since the timing at which the preliminary intervention is executed, the main intervention is executed at S510. The time t is a length of time that is long enough for the driver 90 to adjust the posture. The time t is changeable. The time t may be set by the driver 90. The time t may be set automatically by the intervening unit 230 according to the condition of the saddle-ride type vehicle 10.

If it is decided at S506 that it is not in an emergency, the process of the flowchart ends without executing emergency braking.

Figure 5:
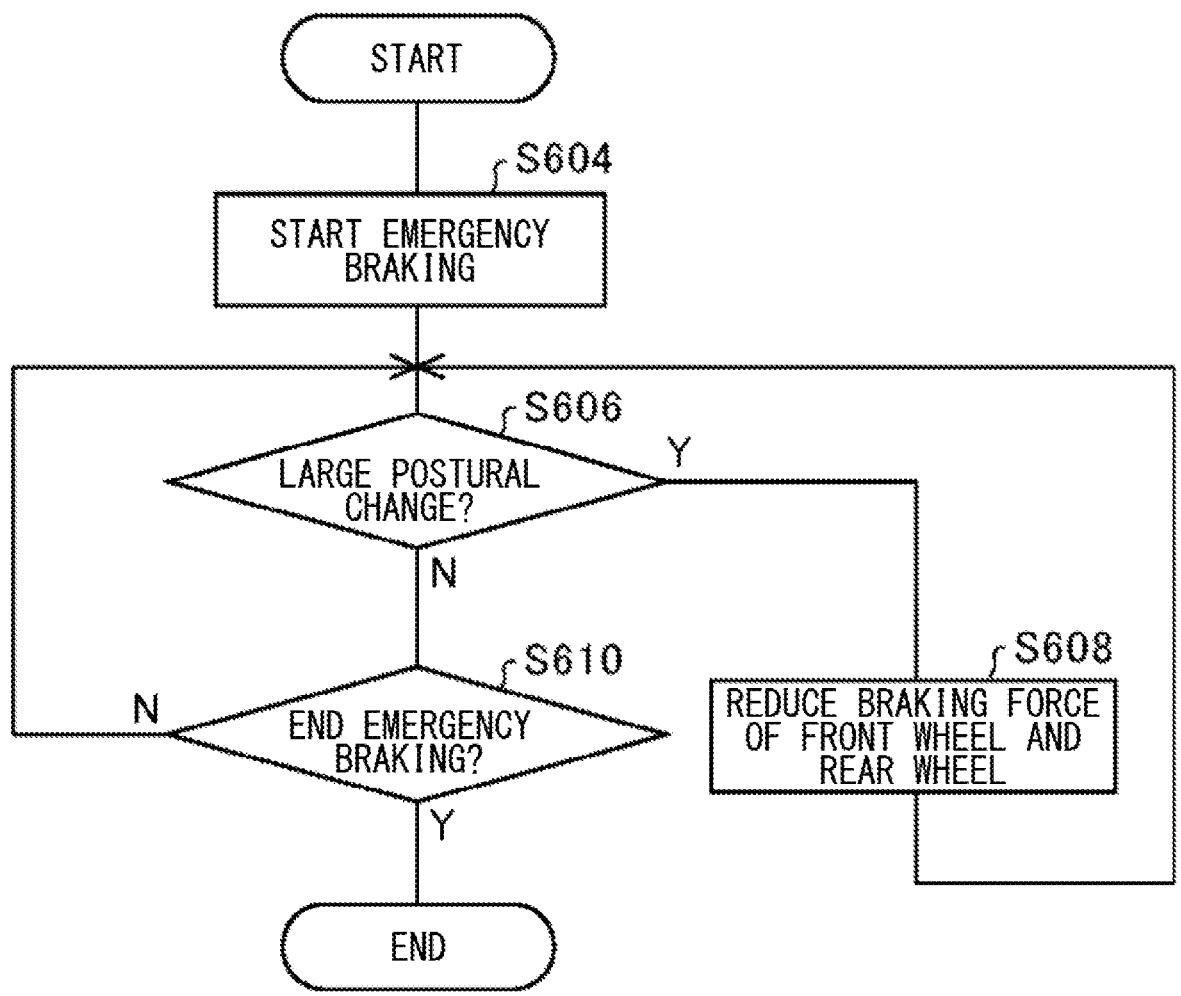
FIG. 5 illustrates an exemplary flowchart illustrating processes to be performed if main intervention in the emergency braking is executed.

FIG. 5 illustrates an exemplary flowchart illustrating processes to be performed if main intervention in the emergency braking is executed. The processes illustrated in FIG. 5 can be applied to the process of emergency braking at S510 illustrated in FIG. 4.

At S604, based on the braking force determined at S504, the intervening unit 230 controls the front wheel brake 240 and rear wheel brake 250 to start execution of emergency braking. At S606, based on results of sensing by the individual sensors after S604, the intervening unit 230 decides whether or not the postural change of the driver 90 is equal to or larger than a predetermined reference value. If it is decided that the postural change is equal to or larger than the predetermined reference value, the braking force of the front wheel 70 and rear wheel 72 is reduced at S608, and the process proceeds to S606.

If it is decided at S606 that the postural change is smaller than the predetermined reference value, it is decided at S610 whether or not to end emergency braking based on the condition of the saddle-ride type vehicle 10. If it is decided not to end emergency braking, the process proceeds to S606. If it is decided to end emergency braking, the processes of this flowchart are ended. Note that if the postural change before and after starting emergency braking is smaller than a predetermined reference value at S606, it is permitted to raise the level of intervention further.

Emergency braking can be performed for example if an inter-vehicle distance to a front vehicle is to be kept at a certain distance, if a vehicle is to be decelerated urgently at the entrance of a curved road, the exit of a tunnel or the like, or in other cases. Note that emergency braking is exemplary control of intervention in driving of the saddle-ride type vehicle 10. Examples of intervention in driving of the saddle-ride type vehicle 10 include emergency acceleration control or the like, other than the above-mentioned control of the steering system 260. Control based on the level of intervention by the control apparatus 100 is suitable if control that may change the speed or posture of the saddle-ride type vehicle 10 is urgently performed.

As explained above, according to the saddle-ride type vehicle 10, in situations where the balance of the driver 90 can be easily lost if driving of the saddle-ride type vehicle 10 is intervened, as in cases such as that the driver 90 is not assuming a stand-ready posture, the driver 90 is not looking ahead, or a passenger is present, the level of intervention in the driving of the saddle-ride type vehicle 10 can be lowered. Because of this, it is possible to prevent intervention in driving of the saddle-ride type vehicle 10 from causing a significant loss of balance of the driver 90.

Note that the saddle-ride type vehicle may be any type of vehicle in general that occupants ride astride when they travel with it. The saddle-ride type vehicle may not only be a two wheel vehicle such as a motorcycle or a motorized bicycle, but also be a three wheel vehicle such as a trike, or a four wheel vehicle. The three wheel vehicle may be a front single-wheel, and rear double-wheel vehicle, or a front double-wheel, and rear single-wheel vehicle. Note that the two wheel vehicle may be a scooter type two wheel vehicle having one or more floor steps at a front portion thereof.

FIG. 6 schematically illustrates an exemplary computer 1000 to function as the control apparatus 100. The computer 1000 according to the present embodiment includes: a CPU peripheral unit having a CPU 1010, a RAM 1030, and a graphics controller 1085 that are interconnected by a host controller 1092; and an input/output unit having a ROM 1020, a communication I/F 1040, a hard disk drive 1050, and an input/output chip 1080 that are connected to the host controller 1092 by an input/output controller 1094.

The CPU 1010 performs operations based on programs stored on the ROM 1020 and RAM 1030, and performs control of each unit. The graphics controller 1085 acquires image data generated by the CPU 1010 or the like on a frame buffer provided in the RAM 1030, and displays the image data on a display. Instead of this, the graphics controller 1085 may include therein a frame buffer to store image data generated by the CPU 1010 or the like.

The communication I/F 1040 communicates with another device via a network through a wired or wireless connection. In addition, the communication I/F 1040 functions as hardware to perform communication. The hard disk drive 1050 stores programs and data to be used by the CPU 1010.

The ROM 1020 stores a boot-program to be executed by the computer 1000 at the time of activation and programs or the like that depend on hardware of the computer 1000. The input/output chip 1080 connects various types of input/output devices to the input/output controller 1094 via, for example, a parallel port, a serial port, a keyboard port, a mouse port, and the like.

Programs to be provided on the hard disk drive 1050 via the RAM 1030 are provided by a user in the form stored on a recording medium such as an IC card. The programs are read out from the recording medium, installed on the hard disk drive 1050 via the RAM 1030, and executed at the CPU 1010.

The programs that are installed on the computer 1000, and make the computer 1000 function as the control apparatus 100 may act on the CPU 1010 or the like to make the computer 1000 function as each unit of the control apparatus 100. Information processing described in these programs are read in by the computer 1000 to thereby make the computer 1000 function as the acquiring unit 210, driving control unit 200, determining unit 220, and intervening unit 230, which are specific means attained by cooperation between software and various types of hardware resources mentioned above. With these specific means, the unique control apparatus 100 corresponding to a purpose of use of the computer 1000 in the present embodiment can be constructed by realizing operations on or processing of information corresponding to the purpose of use.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: saddle-ride type vehicle;
11: head pipe;
20: seat;
22: seat;
40: structure;
50: steering handle;
60: front wheel suspension device;
62: rear wheel suspension device;
70: front wheel;
72: rear wheel;
90: driver;
120: sensor;
122: sensor;
130: sensor;
132: sensor;
140: sensor;
150: sensor;
160: sensor;
162: sensor;
170: sensor;
180: sensor;
200: driving control unit;
210: acquiring unit;
220: determining unit;
230: intervening unit;
240: front wheel brake;
250: rear wheel brake;
260: steering system;
280: vehicle-side sensor;
290: occupant-side sensor;
100: control apparatus;
1000: computer;
1010: CPU;
1020: ROM;
1030: RAM;
1040: communication I/F;
1050: hard disk drive;
1080: input/output chip;
1085: graphics controller;
1092: host controller;
1094: input/output controller

What is claimed is:

1. A saddle-ride type vehicle control apparatus comprising:
an acquiring unit that acquires information indicating a posture of an occupant of a saddle-ride type vehicle;
a determining unit that determines a level of intervention in driving of the saddle-ride type vehicle based on the posture of the occupant indicated by the information acquired by the acquiring unit; and an intervening unit that intervenes in the driving of the saddle-ride type vehicle based on a condition of the saddle-ride type vehicle and the level of intervention determined by the determining unit, wherein the determining unit compares postures of the occupant before and after the intervening unit operates a braking device of the saddle-ride type vehicle, and as a postural change of the occupant indicated by a result of the comparison increases, the level of intervention in the driving of the saddle-ride type vehicle determined by the determining unit lowers.

2. The control apparatus according to claim 1, wherein the intervention includes main intervention, and preliminary intervention which is executed in advance prior to the main intervention at a lower level of intervention than the main intervention.

3. The control apparatus according to claim 1, wherein the posture of the occupant is judged based on force applied to a seat on which the occupant is seated, or force applied to a step on which the occupant places a foot.

4. The control apparatus according to claim 3, wherein as a difference in applied force between left and right steps increases, or a degree of non-uniformity within the seat surface of the seat of force applied to the seat surface increases, the level of intervention in the driving of the saddle-ride type vehicle determined by the determining unit lowers.

5. The control apparatus according to claim 1, wherein
the acquiring unit further acquires information indicating a line of sight of the occupant, and
the determining unit changes the level of intervention based on the line of sight of the occupant indicated by the information acquired by the acquiring unit.

6. The control apparatus according to claim 1, wherein
the acquiring unit further acquires information indicating a direction of a head portion of the occupant, and
the determining unit changes the level of intervention based on the direction of the head portion of the occupant indicated by the information acquired by the acquiring unit.

7. The control apparatus according to claim 1, wherein as a permissible intervention amount for the occupant set based on the posture of the occupant decreases, the level of intervention in the driving of the saddle-ride type vehicle determined by the determining unit lowers.

8. The control apparatus according to claim 5, wherein as a permissible intervention amount for the occupant set based on the line of sight of the occupant decreases, the level of intervention in the driving of the saddle-ride type vehicle determined by the determining unit lowers.

9. The control apparatus according to claim 6, wherein as a permissible intervention amount for the occupant set based on the direction of the head portion of the occupant decreases, the level of intervention in the driving of the saddle-ride type vehicle determined by the determining unit lowers.

10. The control apparatus according to claim 1, wherein the intervening unit performs emergency braking control, and operates a braking device of the saddle-ride type vehicle based on braking force set based on: a positional relationship between an object around the saddle-ride type vehicle and the saddle-ride type vehicle; and the level of intervention determined by the determining unit.

11. The control apparatus according to claim 1, wherein the information indicating the posture of the occupant includes information indicating at least one of: knee grip force of the occupant, force applied to a grip portion of a steering handle gripped by the occupant; a lean angle of the saddle-ride type vehicle; and force applied to a front wheel and a rear wheel of the saddle-ride type vehicle.

12. The control apparatus according to claim 11, wherein the determining unit determines the level of intervention in the driving of the saddle-ride type vehicle based on a balance of applied force between the front wheel and the rear wheel of the saddle-ride type vehicle.

13. The control apparatus according to claim 1, wherein
the acquiring unit further acquires information indicating whether or not a passenger is present, and
the level of intervention in the driving of the saddle-ride type vehicle determined by the determining unit lowers if the information acquired by the acquiring unit indicates that a passenger is present.

14. A saddle-ride type vehicle control apparatus comprising:
an acquiring unit that acquires information indicating a posture of an occupant of a saddle-ride type vehicle;
a determining unit that determines a level of intervention in driving of the saddle-ride type vehicle based on the posture of the occupant indicated by the information acquired by the acquiring unit; and
an intervening unit that intervenes in the driving of the saddle-ride type vehicle based on a condition of the saddle-ride type vehicle and the level of intervention determined by the determining unit, wherein
the determining unit compares postures of the occupant before and after the intervening unit operates a braking device of the saddle-ride type vehicle, and
as a postural change of the occupant indicated by a result of the comparison decreases, the level of intervention in the driving of the saddle-ride type vehicle determined by the determining unit rises.

* * * * *